United States Patent [19]

Sohner et al.

[11] Patent Number: 5,187,803
[45] Date of Patent: Feb. 16, 1993

[54] REGENERATIVE RF BI-DIRECTIONAL AMPLIFIER SYSTEM

[75] Inventors: Harold K. Sohner, Richardson; Michael A. Morgan, Dallas, both of Tex.; Surinder Kumar, Saskatoon, Canada

[73] Assignee: Andrew Corporation, Orland Park, Ill.

[21] Appl. No.: 467,379

[22] Filed: Jan. 18, 1990

[51] Int. Cl.⁵ .......................... H04H 1/00; H04B 7/14
[52] U.S. Cl. ...................................... 455/4.1; 455/51; 455/14; 455/22; 455/55.1
[58] Field of Search ...................... 455/4, 5, 20, 21, 22, 455/23, 304, 305, 14, 15, 55, 303, 306, 4.1, 4.2, 55.1, 5.1, 7

[56] References Cited

U.S. PATENT DOCUMENTS

| | | | |
|---|---|---|---|
| 3,750,020 | 7/1973 | Baba et al. | 455/14 |
| 3,886,454 | 5/1975 | Oakley | 455/4 |
| 4,701,935 | 10/1987 | Namiki | 455/21 |
| 4,972,346 | 11/1990 | Kawano | 455/22 |
| 4,972,505 | 11/1990 | Isberg | 455/15 |

OTHER PUBLICATIONS

David Martin, The Use of In-Line Repeaters in Leaky Feeder Radio Systems for Coal Mines, 1978, 257.

Primary Examiner—Reinhard J. Eisenzopf
Assistant Examiner—Christine K. Belzer
Attorney, Agent, or Firm—Arnold, White & Durkee

[57] ABSTRACT

A regenerative RF bi-directional communications system is provided for establishing RF coverage within a RF block tunnel area. The system uses a plurality of cascaded amplifier stages for periodically regenerating signals which are transmitted and received along a series of radiating cable length which link base station transceivers to hand-held or like mobile communication units. An intermediate frequency distribution system is used so that the required level of amplification is achieved through the several cascaded amplifier stages at the level of low-power IF signals generated from the original RF signals in conjunction with the appropriate oscillator and pilot signals. The IF distribution system restricts the cascading effect occurring due to the plurality of cascaded amplifier stages on the relatively low-power IF signals, thereby producing a negligible amount of intermodulation.

14 Claims, 5 Drawing Sheets

REGENERATIVE RF BI-DIRECTIONAL AMPLIFIER SYSTEM

FIELD OF THE INVENTION

The present invention generally relates to radio frequency (RF) communication systems using regenerative amplifiers. More particularly, this invention relates to an improved RF communication system using cascaded regenerative amplifiers in which excessive intermodulation distortion is avoided.

BACKGROUND OF THE INVENTION

In implementing a variety of RF communication systems such as high frequency terrestrial communication systems, broadcast transmitting antenna systems, and particularly cellular and land mobile radio systems, a major obstacle is the provision of optimum RF coverage in difficult, confined areas such as tunnels, subways, depressed roadways, buildings, etc., where radiating RF energy is substantially blocked in both the transmitting and receiving directions. The problem is typically approached by using some form of directional antenna or radiating cable system for obtaining adequate coverage throughout the confined or blocked areas.

Tunnels represent a particularly difficult environment for RF coverage because of the natural blockage presented to high frequency radio signals by the concrete, earth and steel disposed throughout the confines of the tunnels. In small tunnels, optimum RF coverage can be obtained by using directional antennas which are disposed at the tunnel portals and appropriately adjusted. A major disadvantage associated with the use of directional antennas, however, is that any large deviations in the tunnel geometry such as bends or turns can result in significant signal loss. In addition, such an approach is also highly prone to blockage from large vehicles such as trucks and trailers, and is impractical for use with extended enclosed areas such as long tunnels or subways.

RF coverage for very long tunnels or subways has generally been provided by using distributed antenna systems using low-loss coaxial cable or fiberoptic arrangements for signal distribution, and a series of antennas which are fed by taps attached to the transmission line. The problem with this approach is that, since high frequency radio signals are completely confined to the tunnel due to the natural RF blocking properties of the tunnel composition, the radiation pattern of point source radiators, such as antennas, can cause reflections resulting in serious multi-path fading and signal attenuation and nulling. Further, it becomes necessary that the distributed antennas be carefully tuned in order to maintain the necessary isolation among the plurality of system antennas.

A conventional approach to providing optimum signal distribution and coupling of RF energy within tunnels or subways without employing discrete antennas has been the use of radiating cables. As opposed to standard coaxial cables which transmit electrical signals to and from a generating station to some form of antenna from where the signals are radiated, radiating cables themselves function as continuous antennas— electrical or radio signals are transmitted directly from the cables rather than from an antenna. Such radiating or "leaky" coaxial cables form efficient and economic sources for transmitting radio frequency signals in a variety of applications such as 2-way mobile radio, radio paging and other localized broadcast services in applications involving extended underground installations. The radiating cable approach becomes indispensable in applications such as railways, subways, mines and tunnels, where conventional centralized VHF and UHF communication systems are not practical.

In radiating cables, slots are provided in the typically corrugated metallic outer conductor of a coaxial cable to allow a controlled portion of the transmitted RF signals to radiate along the entire length of cable. Conversely, signals transmitted near the cable will couple into these slots and be carried along the cable back to the associated base station receiver. Because radiating cables can be designed for broadband operation, it is possible for a single length of radiating cable to simultaneously handle two or more communication systems. Since the cable can conveniently be routed wherever signal coverage is needed, radiating cables can be adapted for operation in areas of any form-factor, open or enclosed, which require localized coverage.

Because of the above advantages, the radiating cable approach is increasingly being used in tunnel coverage systems where two-way RF communications between base station transceivers and portable or mobile communication units is essential. In these systems, signals transmitted to and from base stations to mobile communication units within a tunnel are distributed through a series of amplifiers over a plurality of radiating cable lengths. Because of the finite coaxial attenuation factor of the radiating cable, it becomes essential to use signal amplifiers at periodic intervals. The amplifiers are typically bi-directional in order to accommodate and amplify signals moving along the cable in both directions, and provide a fixed amount of gain for each RF carrier signal in each signal direction. Since most communication systems utilize multiple carriers for normal operations, it becomes necessary to use Class-A linear amplifiers capable of providing wide-band gain.

Since ideal linear amplifiers cannot be realized in practice, two-way communication systems using the radiating cable approach are subject to signal distortion resulting from the finite amount of intermodulation distortion generated due to component non-linearities when amplification occurs at high power levels. Out-of-band intermodulation does not present a serious problem because it can usually be filtered out of the system. However, in-band intermodulation caused by intermodulation frequencies resulting from undesirable combinations of sinusoidal components of input frequencies can substantially affect system performance since it represents a noise source to a receiving unit which cannot be filtered.

The intermodulation distortion problem is further compounded when a plurality of amplifiers are cascaded in order to achieve the high transmission signal levels necessary to combat coaxial loss resulting from use of radiating cable across long tunnels or subways. When a chain of cascaded amplifiers exists, the intermodulation produced by one stage is amplified by the gain factor of each succeeding stage, which in itself generates further intermodulation components. In effect, in-phase addition of frequency components at each stage of amplification in a cascaded amplifier system also realizes a cascading or compounding of the intermodulation components. The end result is serious degradation of the RF signals to an unmanageable level.

Accordingly, in previously known systems, the implementation of radiating cable based two-way RF communication has severe restrictions regarding the practical number of amplifiers that may be used in any single chain.

SUMMARY OF THE INVENTION

It is a primary object of the present invention to provide an improved RF bi-directional amplifier system exhibiting a substantially reduced amount of intermodulation distortion resulting from successive signal amplification.

In this regard, it is a specific object of this invention to provide a regenerative bi-directional amplifier system of the type having a plurality of cascaded amplifier stages, each configured in such a manner that the overall intermodulation generated by the system is substantially independent of the number of amplifier stages.

A related object is to provide a regenerative amplifier system of the above kind in which the in-phase addition of intermodulation components generated at each of the plurality of cascaded amplifier stages is substantially avoided.

Yet another object is to provide such a regenerative amplifier system which is particularly adapted for providing RF coverage in tunnel or subway communication systems or the like using radiating cable for two-way communications between base stations and mobile communication units.

Briefly, in accordance with the system of this invention, the above objects are accomplished by means of a RF communications system using a plurality of cascaded amplifier stages for periodically regenerating signals being transmitted and received along a series of lengths of radiating cable which link base station transceivers to hand-held or like mobile communication units. In accordance with an important aspect of this invention, an intermediate frequency (IF) distribution system is used so that the required level of amplification is achieved through the several cascaded amplifier stages, not directly at the RF signal level, but, instead, at the level of IF signals which are generated from the original RF signals in conjunction with appropriate local oscillator and pilot signals. As a result, the cascading effect occurring due to the plurality of cascaded amplifier stages is restricted to the relatively low power level IF signals, thereby producing a negligible amount of intermodulation components during the various amplification stages.

More specifically, at the base station location, the RF carrier signals which are to be transmitted from the base station across the radiating cable segments to surrounding portable units (the "transmit" signals) are down-converted as a block to an IF level. The down conversion is realized by using a pilot signal in conjunction with a reference signal generated by a local oscillator. The IF signals so generated are subsequently summed with the pilot signal and applied to the radiating cable.

At each amplifier location, the IF signals propagated across the preceding length of radiating cable are up-converted to the level of the original RF frequency signals through a mixing operation using a local oscillator signal derived from the reference pilot signal. Subsequently, the regenerated RF frequency signals are amplified, combined with the IF and pilot signals, and then applied to the succeeding length of radiating cable. Consequently, the transmit RF frequency signals are regenerated at each amplifier location from low level IF signals using a heterodyne process. It is significant that the RF signals are not cascaded through the various stages of the amplifier chain. Instead, the IF signals, which are at relatively low power levels, are cascaded through the various amplifier stages, thereby producing a negligible amount of intermodulation components and associated distortion.

According to another aspect of this invention, the RF frequency signals which are to be received from the portable units and transmitted across the radiating cable lengths to the base stations (the "receive" signals) are not subjected to the above-described heterodyne process at all of the cascaded amplifier stages; instead, the receive signals are directly amplified at the RF frequency level at the cascaded amplifier stages.

In the case of the transmit signals, it is essential to provide a substantially high power level at the receiver end because the signals at the output of each amplifier stage must have a power level sufficient to overcome a variety of signal attenuation factors including the coaxial loss of the cable, the coupling loss, the portable antenna loss, etc. The requisite high power levels, in turn, generate substantial intermodulation components when successively processed by the cascaded amplifier stages. In the case of the receive signals, however, the signal levels applied to the input of the amplifier stages are low enough that intermodulation is usually not a problem, so that the IF distribution system may be dispensed with.

According to another feature of this invention, the cascaded amplifier stages comprising the two-way RF communications system of this invention, are continuously monitored for operations failure in both the transmit and receive paths using the pilot and the IF signals. Preferably, the monitoring function is performed by a centralized computer which is linked to the regenerative amplifier system by means of an appropriate interface, such as a SCADA (Supervisory Control and Data Acquisition) interface, having a parallel input/output port providing both status information and amplifier control. In addition, the gain control adjustment of the transmit and receive path signals can also be controlled by the central computer in order to counteract the effect of flow variations in gain levels resulting from exposure of the amplifiers to seasonal temperature variations and long-term aging of the amplifiers and the radiating cable.

In accordance with yet another aspect of this invention, an IF distribution system is also used for the base station receive path in applications where the length of coaxial cable feeding signals to the radiating cable and from the base station lengths used in the RF blocked area is sufficiently long that high frequency RF carrier signals are unduly attenuated. Under such conditions, it becomes necessary to use several bi-directional amplifiers to compensate for the attenuation loss suffered by RF signals, particularly along the coaxial feeder line in the receive path from mobile or portable communication units to the base stations.

The use of an IF-based system allows the transmission of received signals along the coaxial feeder line with adequate power levels without the use of a plurality of bi-directional amplifiers. The same pilot carrier signal that is used on the transmit side for reducing excessive intermodulation distortion at the cascaded amplifier stages is also used on the receive side to up-convert and down-convert the receive RF signals to and from specified IF frequencies.

BRIEF DESCRIPTION OF THE DRAWINGS

Other objects and advantages of the present invention will become apparent upon reading the following detailed description and upon reference to the drawings in which.

DESCRIPTION OF THE PREFERRED EMBODIMENTS

Figure 1:
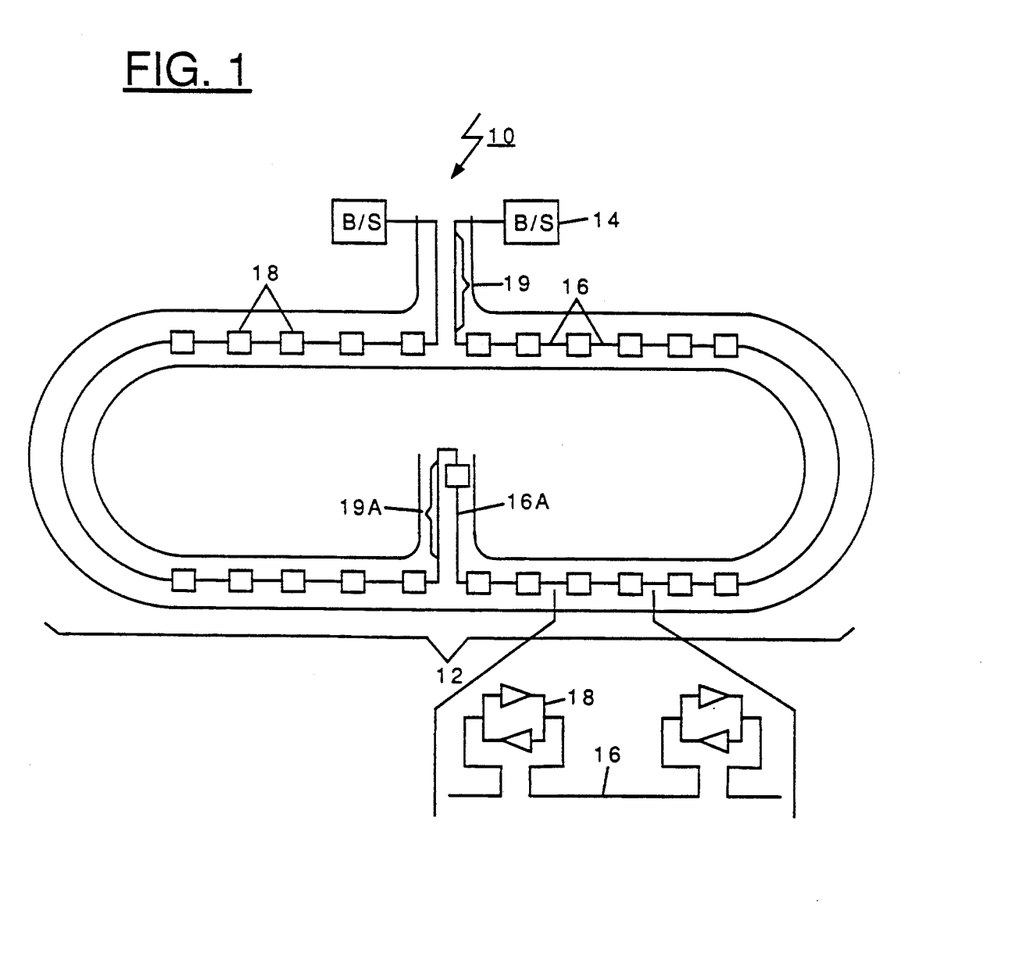
FIG. 1 is a diagram depicting a two-way communications system for establishing RF communications between base stations and mobile communication units within a tunnel or like RF blocked area.

Referring now to FIG. 1, there is shown a two-way communication system 10 for providing RF coverage within an enclosed area such as a tunnel 12. According to this system of FIG. 1, a plurality of base stations 14 are linked together by means of a plurality of radiating cable lengths 16. The radiating cable 16 is typically of the slotted type wherein slots disposed on the metallic outer conductor of the cable permit a controlled portion of the electromagnetic signals being transmitted there through to radiate along the length of the cable. The radiating cable approach is particularly advantageous in two-way communication systems because electromagnetic signals transmitted near the cable are coupled into the radiation slots and carried along the length of the cable back to the associated base stations. Accordingly, radio signals transmitted by mobile or portable communication ("radio") units in the vicinity of the radiating cable can be picked up directly by the cable and relayed to the base stations.

Lengths of conventional coaxial cable line 19 are used to feed signals to and from the base station 14 and the radiating cable lengths 16 within the tunnel area. Radiating cable is not used in these areas since the need for radiation of RF signals exists only within the tunnel area where the radio units are positioned.

In a communication system of the above type using radiating cable, the loss in signal level inherently caused by the cable restricts the length of cable over which RF signals may be propagated without degradation of the transmitted signals below a required threshold level. As a result, it becomes necessary to boost or amplify the transmitted RF signals at periodic intervals over the enclosed area through which the cable is used to establish two-way communications. In practice, signals transmitted between the base stations 14 and radio units (not shown) are distributed through a series of amplifiers 18 linking the plurality of radiating cable lengths 16. As also shown in FIG. 1, the amplifiers 18 are typically bi-directional in order to accommodate and amplify signals propagated along the cable in both the transmit and receive directions. More specifically, each amplifier 18 includes an amplification stage providing a fixed amount of gain for the propagated RF signals in each signal direction.

In order to accommodate the multiple RF carriers typically used in most communication systems, the amplifiers 18 usually need to be class-A linear amplifiers which are capable of providing wide-band gain. As described above, the inherent component non-linearities which exist even in "linear" amplifiers at high power levels result in substantial signal distortion due to the generation of a finite amount of intermodulation distortion. In a typical RF communication system having a plurality of bi-directional amplifiers cascaded together, each amplifier stage generates intermodulation components, and the intermodulation produced by one stage is amplified by the gain factor of each succeeding stage. The production of in-phase intermodulation frequency components at each stage of amplification compounds the intermodulation distortion to such an extent that serious degradation of the RF signals results.

In order to combat the cascaded intermodulation effect, it is important to minimize the amount of intermodulation power generated by each of the linear amplifiers which, in turn, can be realized by reducing the total output power from the saturated level of the amplifier stages. The "back-off" power $P_{Bo}$ necessary to limit third order intermodulation components may be expressed as follows:

$$P_{Bo} = B_s/(N * P_c) \quad (1)$$

where $B_s$ is the saturated output power of each amplifier stage, N is the total number of RF carriers to be processed by the amplifier, and $P_c$ is the power per carrier.

In designing a cascaded amplifier system of the type shown in FIG. 1, an important system design parameter is the ratio of carrier power to the intermodulation power, commonly referred to as the carrier-to-intermodulation ($C/I_m$) ratio. The ratio is expressed in dBs and represents the amount of desired signal power existing in the presence of undesired intermodulation power. Since the RF system configuration shown in FIG. 1 consists of a series of cascaded amplifiers, the total intermodulation contribution of each amplifier must be considered and is defined as follows:

$$C/I_m(\text{Amp}_1) = 10 * \log_{10}(10.67 * P_{bo}^2) \quad (2)$$

If N amplifier stages are cascaded together, the overall carrier-to-intermodulation ratio for the system is defined as follows:

$$C/I_m(\text{System}) = C/I_m(\text{Amp}_1) - 20 * \log_{10}(N) \quad (3)$$

It is apparent from the above relationship that the system $C/I_m$ performance of a cascaded amplifier system is degraded by a factor of $20 \log_{10}(N)$, which represents 6 dBs of degradation for each additional amplifier in a chain of cascaded amplifier stages. Accordingly, the practical number of amplifier stages that may be used in a chain of cascaded amplifiers for implementing a transmission cable-based RF coverage system for tunnels is severely restricted.

The regenerative RF bi-directional amplifier system in accordance with the system of this invention eliminates the above-discussed cascaded RF amplifier intermodulation effect.

In accordance with an important aspect of this invention, an intermediate frequency (IF) distribution system is used instead of amplifying the propagated signals directly at the original RF frequency levels. The result is to restrict the cascading effect occurring due to the plurality of cascaded amplifier stages to the relatively low power IF signals. Consequently, the amount of intermodulation generated during the various cascaded amplifier stages is restricted to a negligible level.

Figure 2:
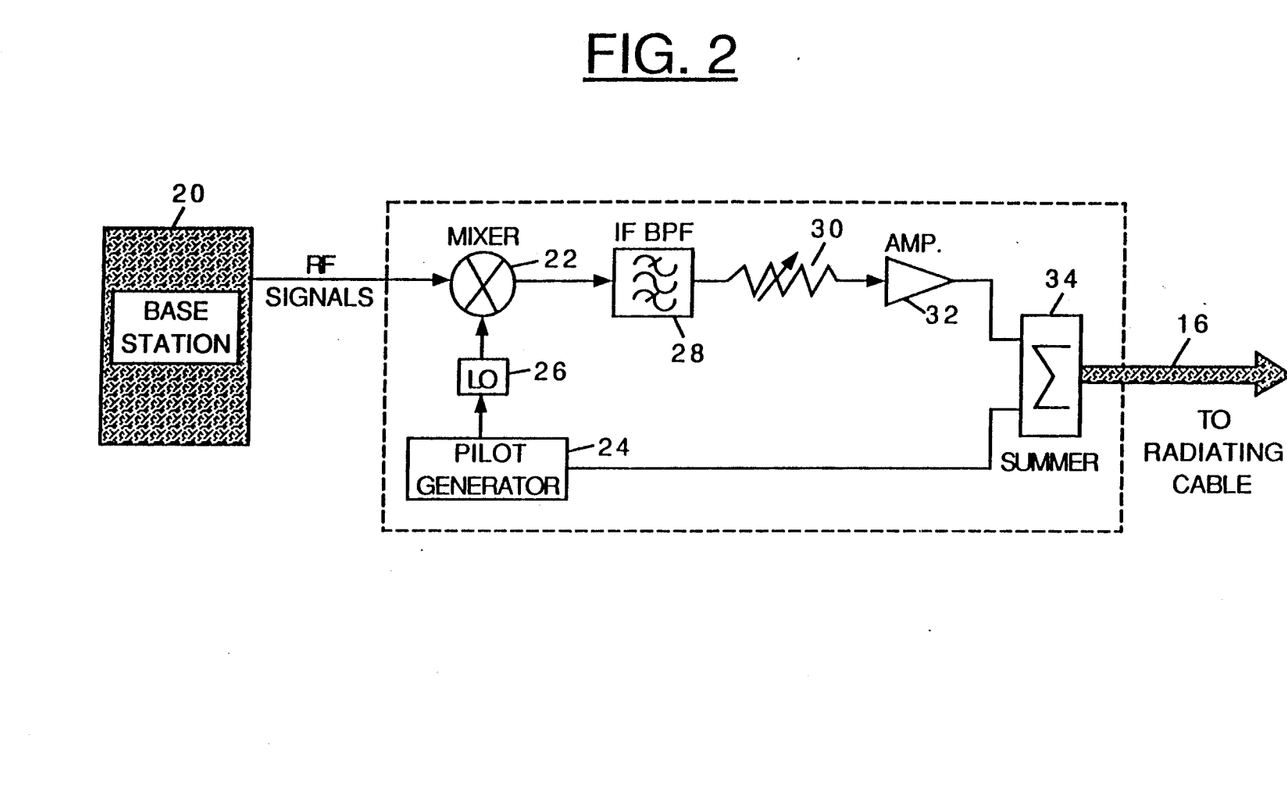
FIG. 2 is a block diagram illustrating the manner in which RF signals are down-converted to an IF level prior to transmission over the radiating cable.

More specifically, at the base station location, the RF carrier signals which are to be transmitted across the radiating cable are downconverted to a predefined IF level prior to transmission over the radiating cable lengths. An arrangement for accomplishing this result is shown in FIG. 2, where signals from transmitting units at the base station 20 are fed to a conventional mixer 22. The other input to the mixer 22 is a pilot signal generated by a pilot generator 24 in conjunction with an associated local oscillator 26. The frequency of the pilot tone is selected to be such that the input RF frequency signals to the mixer are effectively down-converted to the desired IF level.

A narrow band of signals from the down-converted IF signals are filtered by using a band pass filter (BPF) 28 and are fed through an appropriate load 30 to an amplifier 32. The signal generated by the pilot generator 24 is also fed to a summing unit 34 which receives its other input from the output of amplifier 32. The output of the summing unit 34 represents the combination of the filtered IF signals and the pilot signal, and is applied to the radiating cable 16 for transmission through the tunnel area. The pilot signal is sent over the radiating cable 16 for use by the subsequent amplifier stages.

Figure 3:
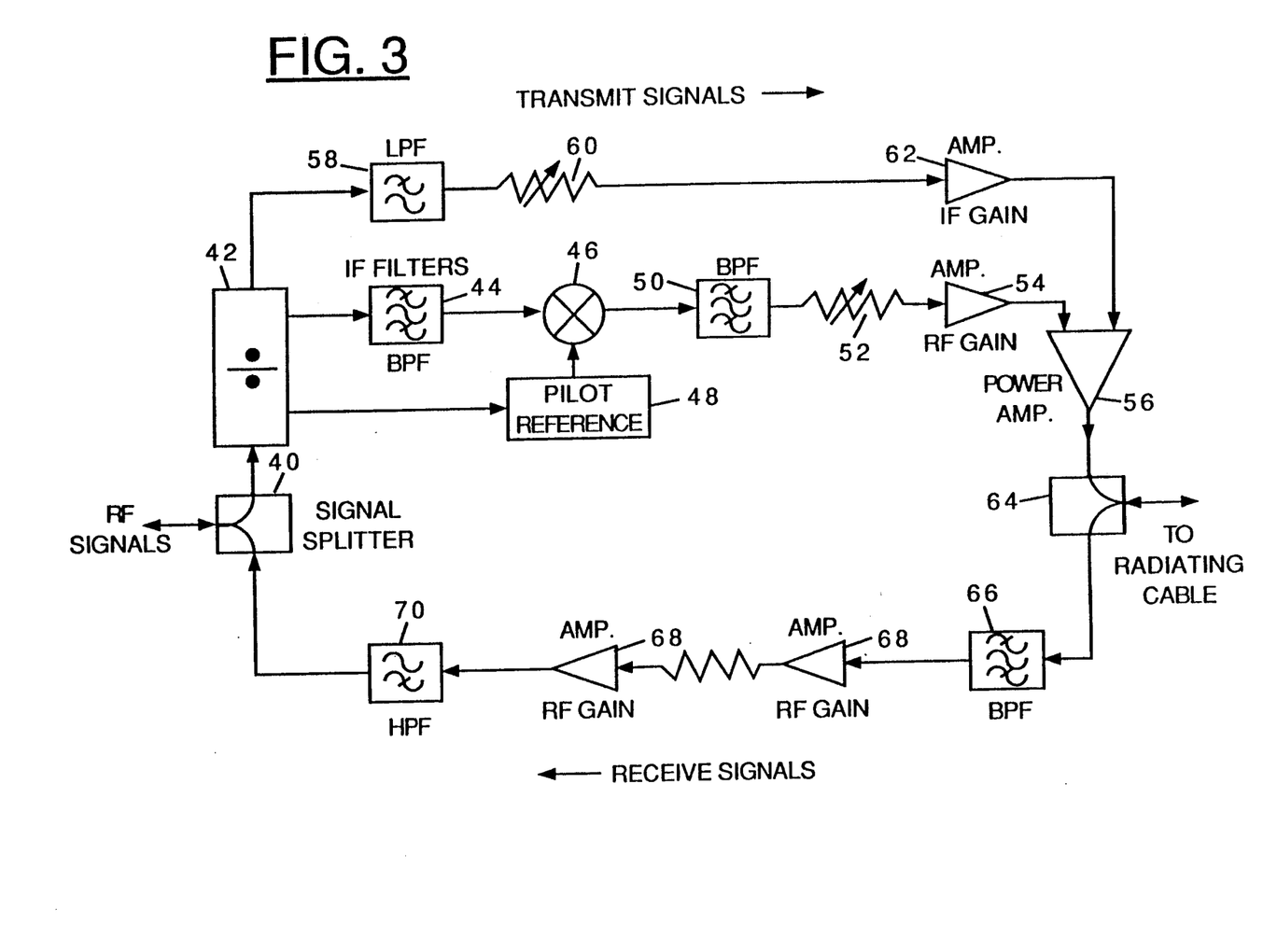
FIG. 3 is a schematic block diagram illustrating the manner in which RF signals are regenerated at the amplifier stage.

At each of the amplifier stages, the IF signals being propagated across the radiating cable lengths are up-converted to the original RF frequency through a mixing operation using a local oscillator signal derived from the reference pilot signals also transmitted over the radiating cable. A representative arrangement for accomplishing this is shown at FIG. 3, where the transmit RF signals are passed through a bi-directional signal splitter (or combination divider/summer) 40. In the transmit direction, the RF signals pass through a signal divider 42, one output of which leads to a band pass filter 44 which allows a selected band of frequencies to pass through to a mixer 46.

The mixer 46 is fed with a local oscillator signal generated by a pilot reference recovery circuit 48, which extracts the pilot tone transmitted with the IF signals over the radiating cable. The mixing operation effectively up-converts the filtered IF signals back to the original RF frequency, a selected band of which is filtered by a band pass filter 50. The filtered RF signals pass through a variable attenuator 52 into a preamplifier 54 which provides the requisite RF gain before the signals are fed to the final power (summing) amplifier 56 of the amplifier stage. Subsequently, the amplified signals are passed through a bi-directional signal splitter 64 and then radiated by the radiating cable length linking the amplifier stage to the succeeding stage of amplification for reception by radio units within the coverage area in the vicinity of the cable.

Signals from the divider 42 are also passed through a low pass filter 58 which passes only the IF signals which need to be propagated downstream of the amplifier stage for subsequent regeneration of the RF frequencies. The filtered IF signals pass through a variable attenuator 60 and a preamplifier 62 which provides the requisite IF gain before being applied to the final power amplifier 56. The amplified IF signals are subsequently transmitted over the radiating cable along with the RF signals.

Thus, the transmit RF frequencies are regenerated at each amplifier stage through a heterodyne process from low level IF signals. The IF signals are cascaded through the amplifier chain at relatively low power levels, thereby producing a negligible amount of intermodulation frequency components. It is significant that the regenerated RF signals are not cascaded through the amplifier chain. Instead, the signals undergo a single level of amplification at each amplifier stage prior to propagating through the associated radiating cable length to be radiated therefrom to nearby radio units.

It should be noted that, in the transmit direction, the signals at the output of each amplifier stage must possess a power level sufficient to overcome the co-axial loss of the cable, the coupling loss, the loss associated with the receiving antenna, etc., and yet retain a sufficiently high signal level for the receiving units. As a result, relatively high power levels are required per carrier.

The arrangement of FIG. 3, realizes the desired high signal carrier levels since the RF gain level at each amplifier stage can be appropriately adjusted. The desired signal power level is achieved without the intermodulation distortion typically associated with conventional amplifier systems. This is because the RF signals are not cascaded through the various amplifier stages and, instead, only the low power level IF signals are cascaded through the amplifier stages.

For transmission along the receive path, i.e., for communications from radio units to the base stations, the signal levels applied to the input of each amplifier stage are sufficiently low that any associated intermodulation does not unduly distort the transmitted signal levels and, accordingly, can be ignored. Consequently, the receive signals can be amplified directly at the RF frequency levels without employing the above-described heterodyne process used for the transmit signals. In the arrangement of FIG. 3, the receive signals are directed through the bi-directional signal splitter 64 and then passed through a band pass filter 66 which passes only the desired RF transmit frequencies. The filtered RF signals pass through one or more signal amplifiers 68, each providing a preselected amount of RF gain. Next, the amplified signals pass through a high pass filter 70 before being routed through the signal splitter 40 to the radiating cable lengths and eventually to the base station.

Figure 4:
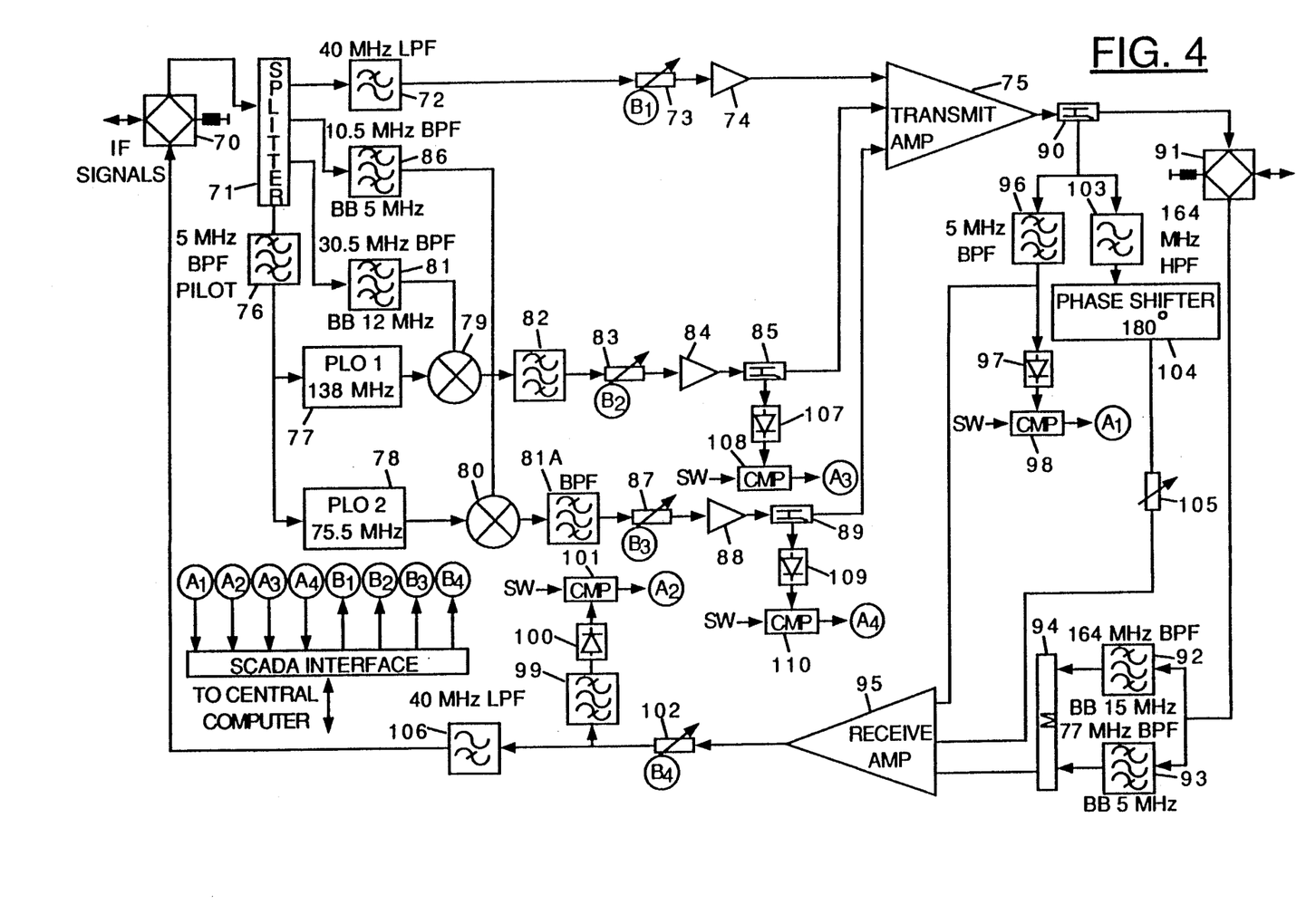
FIG. 4 is a detailed block diagram of a bi-directional amplifier adapted for use with the IF signals generated by the arrangement of FIG. 2, in accordance with a preferred embodiment of this invention.

Referring now to FIG. 4, shown is a detailed diagram of a preferred embodiment of a bi-directional amplifier adapted for use with the IF signals generated by the arrangement of FIG. 2. The preferred arrangement of FIG. 4, is described in connection with a communication system using two separate bands of RF carrier frequencies centered at 80 MHz. and 160 MHz., and a pilot tone of 5 MHz. It will be apparent that two separate IF bands, $IF_1$ and $IF_2$, corresponding to the two RF carrier bands to be used. The regeneration of RF signals at each amplifier stage is described herein with respect to these two bands of carrier frequencies for illustrative purposes only. It will be obvious to those skilled in the art that just one band or more than two bands of RF carrier frequencies may be used depending on the number of channels, and the transmission capacity of each such channel, required to accommodate the desired usage capacity of the system.

As shown in FIG. 4, the IF signals in the transmit path are applied to a bi-directional coupler 70 where the transmit and receive signals are separated. Subsequently, the transmit signals are applied to a four-way power splitter 71 the outputs of which are applied to four signal paths which are described in detail below.

The first path provides amplification gain for the IF bands. The composite transmit signals are passed through a low pass filter (LPF) 72 having a 3-dB cut-off frequency of 40 MHz. so that all signals other than the 5 MHz. pilot and the two IF bands $IF_1$ and $IF_2$ are rejected. The filtered signals are then applied to a programmable attenuator 73, the attenuation factor of which is controlled by a signal $B_1$ applied to its control input. Subsequently, the filtered composite signals pass through a fixed gain stage 74. The output of the fixed gain stage 74 is applied to one input of the final power amplifier 75 of the amplifier stage.

Preferably, the command signal $B_1$ for controlling the programmable attenuator 73 is delivered from the control port on a computer interface, such as the SCADA interface, leading to a central computer adapted to control the operation of the overall RF coverage system. A preferred arrangement for programmably controlling various aspects of a RF communications system using such an interface is described in co-pending U.S. application entitled "DISTRIBUTED AMPLIFIER NETWORK MANAGEMENT SYSTEM" which is also owned by the assignee of the present application; the disclosure in that application is incorporated herein by reference.

The second signal path from the power splitter 71 leads to a band pass filter 76 which extracts the 5 MHz. pilot signal included with the transmit IF signals The extracted pilot signal is then applied to the inputs of phase-locked oscillators (PLOs) 77 and 78 operating at frequencies adapted to upconvert the IF bands to the original RF levels through a pair of associated mixers 79, 80, respectively. More specifically, in order to obtain the original RF frequency levels of 80 Mhz and 160 Mhz, the phase-locked oscillator 77 operates at a frequency of 138 MHz. and the phase-locked oscillator 78 operates at a frequency of 75.5 MHz.

The third output path from the signal splitter 71 leads to a band pass filter 81 centered at a frequency of 30.5 MHz. and hexing an effective bandwidth of 12 MHz to realize the first IF band of frequencies (IF). This band of filtered frequencies is then mixed with the 138 MHz. signal from the PLO 77 at the mixer 79 so as to produce both sum and difference frequency component. The sum components are subsequently retained by passing the signals through a band pass filter 82 centered at 168.5 MHz. having a bandwidth of 12 MHz. to effectively regenerate the original RF signals. The resultant RF carrier signals are then applied to a programmable attenuator 83 which is controlled by a command signal $B_2$, preferably through the control port of the SCADA interface. Subsequently, the attenuated RF signals are passed through a fixed gain stage 84 from which the signals pass through a coupler 85 to be applied to one input of the final power amplifier 75 for subsequent delivery to the radiating cable connected to the amplifier stage.

The fourth output path of the 4-way splitter 71 delivers the IF transmit signals to a band pass filter 86 centered at 10.5 MHz. and having an effective bandwidth of 5 MHz., to realize the second IF band of frequencies ($IF_2$). This band of frequencies is then mixed with the 75.5 MHz. output of the PLO 78 at the mixer 80 to produce both sum and difference frequency components. A band pass filter 81A centered at 86 MHz. and having a narrow bandwidth of 5 MHz. retains only the sum components from the signals at the output of mixer 80 so as to effectively regenerate the second RF carrier signals. The resultant RF signals are then applied to a programmable attenuator 87, the attenuation factor of which is controlled by a command signal $B_3$ applied to its control port. As with the case of attenuators 73 and 83, the attenuation level of attenuator 87 is preferably controlled through the SCADA control port. The attenuated RF carrier signals are then passed through a fixed gain stage 88 and finally applied through a signal coupler 89 to one input of the final power amplifier 75 for delivery to the radiating cable.

With the above arrangement, the amplifier 75 acts upon the 5 MHz. pilot signal, the $IF_1$ band, the $IF_2$ band, the 86 MHz. band and the 168.5 MHz. band. The amplified output of the amplifier 75 is applied through a signal coupler 90 to a 2-way power splitter 91 from which the signals are applied to the associated radiating cable connected thereto. Preferably, the power amplifier 75 is selected to be capable of providing up to 5 watts (37 dBm) of power for all signals propagating therethrough.

The other input to the 2-way power splitter 91 receives the RF frequencies for the receive path, i.e., the receive signals received from radio units in the vicinity of the radiating cable length associated with the amplifier stage. Such a receive signal is applied to a suitable power divider (not shown) and then to a pair of band pass filters 92 and 93. The BPF 92 is centered at 164 MHz. and has an effective bandwidth of 15 MHz. The other BPF 93 is centered at 77 MHz. and has an effective bandwidth of 5 MHz. The filters 92 and 93 provide the required selectivity for the frequencies in the receive path. In addition, these filters also prevent signals from the transmit path from looping back to the receive path. The outputs of the filters 92 and 93 are summed together at a summing unit 94 and then applied to a fixed gain stage 95.

In accordance with one aspect of this invention, the pilot carrier signal that is used in the transmit paths is also used in the receive path for monitoring amplifier failures. More specifically, the amplified transmit signals at the output of the power amplifier 75 are also directed through the signal coupler 90 to a narrow bandwidth band pass filter 96 having a center frequency of 5 MHz. The output of filter 96 is applied to one input of the amplifier 95 in the receive path.

The output of BPF 96 is also applied to a power detector 97 and then to a comparator 98 having a fixed threshold level. The arrangement is such that the output of comparator 98 is a logical "1" when the 5 MHz. pilot signal is detected, thereby indicating the presence of an acceptable condition. If the pilot signal is not detected, which may occur due to a variety of reasons such as cable failure, etc., the output of comparator 98 will be a logical "0", thereby indicating the presence of a failure. This status condition is preferably interrogated through the status input port of the SCADA interface by means of a command signal $A_1$.

Under normal conditions, the output of the receive amplifier 95 contains the 5 MHz. pilot carrier signal and this condition is detected through a similar arrangement using a 5 MHz. band pass filter 99, a power detector 100 and an associated fixed threshold comparator 101 capable of being interrogated using a signal $A_2$. Prior to detection, the output of the receive amplifier 95 is processed through a programmable attenuator 102 which has its attenuation level controlled by a command signal $B_4$ linked to the SCADA interface. If, for some reason, the receive amplifier 95 fails, a failure condition is indicated by the presence of a logical "0" at the output port of the comparator 101.

Certain of the transmit signal frequencies may fall within the frequency band covered by some of the receive signal frequencies. Since the bi-directional coupler 70 that couples the transmit path output signals with the receive path input signals typically provides only about 30 dB of isolation, it is important that leakage of the transmit path signals be restricted in order to avoid instability and oscillations.

This separation of the transmit signals from the receive signals is achieved by means of a cancellation circuit comprising a high pass filter 103 and a phase shifter 104. More specifically, the output transmit signals from the power amplifier 75 are directed through the coupler 90 to a high pass filter 103 having a cutoff frequency of 164 MHz. The filtered output is then applied to a phase shifter 104 which provides a 180° phase shift for all frequencies at a level higher than 164 MHz. Subsequently, an attenuator 105 is used to adjust the output of phase shifter 104 to a level appropriate for providing cancellation at the output of the receive amplifier 95.

After being processed by the programmable attenuator 102, the combined RF signals coming out of the receive amplifier 95 are filtered through a 40 MHz. low pass filter 106 and then applied to the radiating cable in the receive direction through the bi-directional coupler 70.

Preferably, all of the active devices in both the transmit and the receive paths are continuously monitored for failure on the basis of the pilot signal and the IF signal. At the IF signal level, for instance, the output of the fixed gain stage 84 is also fed through the coupler 85 to a power detector 107 and then to a fixed threshold comparator 108. The comparator output is interrogated using a signal $A_3$ from a status port of the SCADA interface.

Similarly, the IF output of amplifier 88 is coupled through the coupler 89 to a power detector 109 and then to an associated fixed threshold comparator 110. The output of comparator 110 is interrogated using a signal $A_4$ from the SCADA interface. Preferably, each amplifier stage is assigned a unique code "address" which is used by the central control port associated with the SCADA interface to poll each of the amplifier stages sequentially on a periodic basis.

The above arrangement is also advantageous in that the gain control adjustment of the transmit and receive path signals is also easily controlled through the control port of the SCADA interface. The gain levels can, thus, be conveniently varied to account for the slow variations in gain levels resulting from exposure of the cascaded amplifier stages to seasonal temperature variations, as well as from long-term aging of the radiating cable and the amplifiers.

Preferably, each of the amplifier stages is also provided with a completely independent redundant standby system in accordance with the above-described arrangement of FIG. 4. Such a standby system includes a redundant power supply so that the standby system can be powered at all times in order to ensure proper operation. Failure detection is accomplished in the standby system in a manner identical to that in the main amplifier, by using similar pilot detection circuits. The periodic interrogation of the transmit and receive amplifier outputs by the control computer through the SCADA control port allows convenient monitoring and detection of any failure of the amplifiers.

Preferably, the SCADA and control status interface for the standby system is also kept independent of the main amplifier system and has its own address. A dummy load is used at the output of the transmit direction of the standby unit when the unit is not in operation. The SCADA interface incorporates a parallel input/output port providing both status information and amplifier control by means of gain level adjustments and switching of the redundant standby system.

As described above in detail, the bi-directional regenerative amplifiers, in accordance with the system of this invention, are based on a heterodyne approach where the transmit carrier frequencies (80 MHz. and 160 MHz., according to a preferred embodiment), are up-converted from a corresponding pair of intermediate frequencies to eliminate the excessive modulation distortion caused by cascading a plurality of high-power linear amplifiers. Accordingly, a significant function required at the base station location is the generation of the requisite pair of IF frequency bands directly from the RF carriers for distribution over the radiating cable.

As specifically described in connection with FIG. 1, the transmission line used for the propagation of RF signals within the enclosed or RF blocked area is preferably radiating cable. However, the link between the length of radiating cable and the base station in the area outside the blocked or tunneled area is typically formed of conventional co-axial cable since there is no need for radiation of propagating energy in this stretch (as well as other similar stretches) of the 2-way communication link. In addition, in certain areas of a tunnel communications system cable where the shape of the tunnel may necessitate disposition of lengths of transmission lines adjacent each other, it is essential to use non-radiating cable for at least one of the adjacent lengths to avoid radiation interference otherwise resulting from adjacently disposed radiating cable lengths. For instance, in FIG. 1, it is necessary to use a length of non-radiating co-axial cable 19A immediately adjacent the radiating cable length 16A. Where the length of co-axial line is relatively short (of the order of hundreds of meters), the feeder attenuation of the system RF carrier frequencies is not significant and can accommodate both the IF frequencies and the RF frequencies. However, where the co-axial line feeder becomes excessively long (on the order of thousands of meters), particularly, at the feeder end linking the base station to the radiating cable, the feeder attenuation becomes too severe, particularly for high frequency RF carriers. For instance, in the case of the illustrative carrier frequencies referred to in connection with FIG. 4, the attenuation of the coaxial feeder becomes excessive for the 160 MHz. carrier when the feeder length approaches or exceeds 2000 meters. Under these conditions, it becomes necessary to use a plurality of bi-directional amplifiers to compensate for the co-axial loss resulting in the feeder section between the base station and the initial length of radiating cable in the tunnel area. Such a use of several bi-directional amplifiers adds substantially to the installation costs as well as the maintenance costs of the overall RF coverage system.

In accordance with another feature of this invention, the need for using such amplifiers is eliminated by use of an intermediate frequency distribution scheme for the base station transmit and receive path. In particular, the same pilot carrier signal that is used on the transmit path is also used on the receive path for the up-conversion to and down-conversion from the system IF frequencies.

Figure 5:
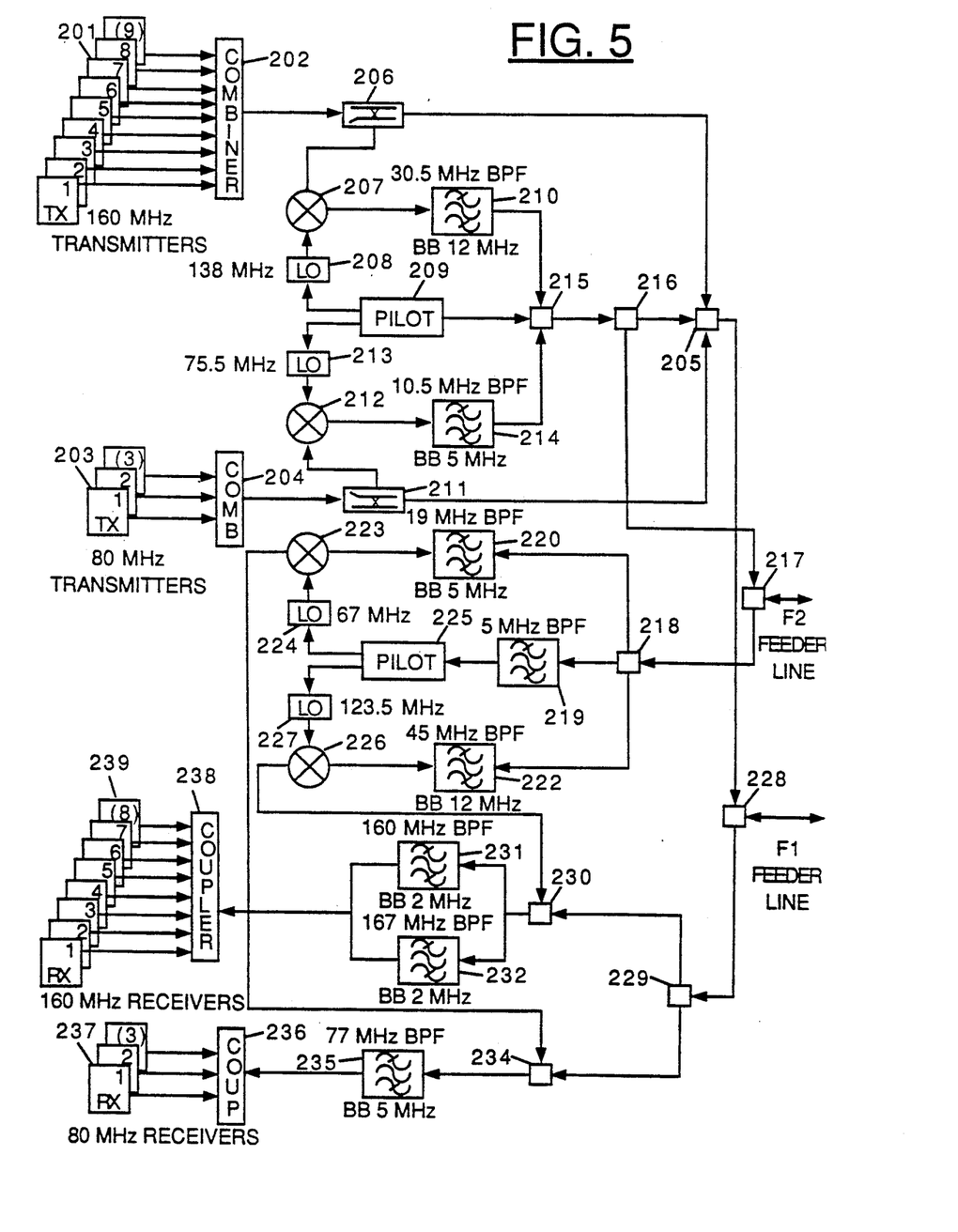
FIG. 5 is a detailed block diagram illustrating a preferred implementation of a base station adapted for use with the IF signals used by the amplifier shown at FIG. 4.

A preferred arrangement for implementing such an IF distribution scheme is illustrated in FIG. 5, where the transmit RF signals are generated by combining outputs provided by a plurality of RF transmitters. According to a preferred embodiment, one backup transmitter and eight operational transmitters are used to generate the 160 MHz. RF signals which are applied to a combiner 202 to produce the first composite RF signal at 160 MHz. Similarly, one backup and two operational transmitters 203 are used to generate separate 80 MHz. RF signals which are combined by a combiner 204 to realize the second composite RF signal. A plurality of transmitters and receivers is need to accommodate the plurality of channels required for handling the typically high volume of simultaneous communications required for most tunnel and subway communication systems.

The two composite RF signals are then combined with the IF signals generated therefrom, and applied to a signal splitter 205 that separates the transmit signals from the receive signals. The output of splitter 205 is then applied to the feeder cable for one of the transmit lines, designated as $F_1$. The backup-transmitters for the 160 MHz. and 80 MHz. RF carriers may be switched in to generate any of the required operational transmit frequencies.

It should be noted that the illustrative arrangement of FIG. 5 is adapted to use the same base station services for handling RF communications between two separate tunnel systems (not shown) fed respectively by feeder lines $F_1$ and $F_2$.

The feeder line $F_2$ is adapted to lead directly to an amplification stage where the requisite RF signals are regenerated. Accordingly, the transmit signals for line $F_2$ need only comprise the IF signals and the pilot signal.

The feeder line $F_1$, however, is adapted to feed RF signals, in addition to the IF signals and the pilot signal, to a radiating cable section so that the RF signals may be radiated before the signals are regenerated from the IF signals prior to being amplified at the first amplification stage.

More specifically, in FIG. 5, a portion of the first RF transmit signal (the 160 MHz. RF signal) at the output of combiner 202 is fed through a directional coupler 206 to one input of a mixer 207.

The other input of the mixer 207 is from a 138 MHz. local oscillator 208 derived from a 5 MHz. pilot reference 209. The output of mixer 207 comprises both sum and difference frequencies based upon the two input frequencies. A band pass filter (BPF) 210 centered at 30.5 MHz. and having an effective bandwidth of 12 MHz. is used to retain only the difference frequencies at the output of mixer 207. The output of the BPF 210 constitutes the first set of frequencies $IF_1$.

Similarly, a portion of the second composite transmit signal (80 MHz. RF signal) at the output of combiner 204 is fed through a directional coupler 211 to one input of a mixer 212. The other input of the mixer is a 75.5 MHz. signal from a local oscillator 213 which operates in conjunction with the 5 MHz. pilot reference 209.

Again, the output of mixer 212 comprises both sum and difference frequencies of the two inputs fed to the mixer. A band pass filter 214 centered at 10.5 MHz. and having an effective bandwidth of 5 MHz. is used to retain only difference frequencies at the output of the mixer 212. The output of BPF 214 constitutes the second set of IF frequencies $IF_2$.

The two sets of IF frequency bands, $IF_1$ and $IF_2$, are combined with the 5 MHz. pilot signal at combiner 215 and are fed through a signal splitter 216. From the signal splitter 216, the signals are combined at combiner 205 with the outputs of the combiners 206 and 211, which comprise the two composite RF carrier signals, for driving the first feeder line $F_1$. The signal splitter 216 also makes available a composite signal comprising the two IF frequency bands and the 5 MHz. pilot carrier for driving the second feeder line $F_2$, through another signal splitter 217, after suitable amplification.

It should be noted that the receive signals from the second feeder line $F_2$ consist of the same pair of IF bands and 5 MHz. pilot reference signal as present on the transmit path. The bi-directional amplifier connected to this feeder is adapted to FIG. 4 generates the required IF band signals and is, therefore, set apart from the other line amplifiers. In practice, this amplifier is similar to the arrangement shown in FIG. 4 but includes additional circuitry similar to the IF band generation arrangement of FIG. 3 for generating the appropriate IF bands adapted to the down-conversion of RF signals from radio units and the subsequent up-conversion to the original RF levels, as described above in detail. Preferably, the center frequencies of the IF bands are kept different from those in the transmit path so as to avoid interference problems.

The receive signals from the $F_2$ line are fed through a power splitter 218 to a set of three band pass filters 219, 220, and 222. The first filter 219 is a narrow bandwidth band pass filter centered at 5 MHz. in order to extract the 5 MHz. pilot carrier from the receive signals. The second filter 220 is centered at 19 MHz. and has an effective bandwidth of 5 MHz. for separating one IF band from the composite receive signal. The output of filter 220 is applied to one input of a mixer 223 which receives its other input from a 67 MHz. local signal derived by a local oscillator 224 from a 5 MHz. pilot recovery circuit 225. The output of mixer 223 includes sum and difference frequencies based on its two inputs, of which only the sum frequencies are retained for providing the 80 MHz. receiver frequencies.

The third band pass filter 222 is centered at a frequency of 45 MHz. with an effective bandwidth of 12 MHz. so as to separate the remaining IF band from the composite receive signals. The output of filter 222 is applied to one input of a mixer 226 which has its other input supplied by a 123.5 MHz. local signal derived by a local oscillator 227 from the 5 MHz. pilot recovery circuit 225. Again, the mixer output results in both sum and difference frequencies, of which only the sum frequencies are retained for providing the 160 MHz. receiver frequencies.

In FIG. 5, the up-converted RF frequencies from the feeder line $F_2$ are combined with the receiver frequencies from the feeder line $F_1$ by a combiner 228 and then applied through a splitter 229 to a combiner 230 which also receives an input from the output of mixer 226. The combined signals are fed to a pair of band pass filters 231 and 232 for separating the 160 MHz. RF band. The BPF 231 is centered at 160 MHz. and has an effective bandwidth of 2 MHz. in order to isolate the low end of the 160 MHz. band. The other BPF 232 is centered at 167 MHz. with a 2 MHz. bandwidth for isolating the high end of the band. The pair of BPFs 231 and 232, in effect, notches out the set of 164 MHz. transmit frequencies that couple through from the associated transmitters at the coupling point for the $F_1$ feeder line.

The receive signals from combiner 229 are further combined with the output signals from the mixer 223 at combiner 234. Subsequently, a band pass filter 235 centered at 77 MHz. and having an effective bandwidth of 5 MHz. is used to separate the 80 MHz. RF band from the composite receive signal.

The separated receive signals at the output of filter 235 are applied through a multi-coupler 236 to each of three 80 MHz. receivers 237, including two operational receivers and one backup receiver. Similarly, the 160 MHz. filtered signals from the output of the filters 231 and 232 are applied through a multi-coupler 238 to each of eight separate 160 MHz. receivers 239, including seven operational receivers and one backup receiver. As in the case of the backup transmitters, the 160 MHz. backup receiver and the 80 MHz. backup receiver may each be controllably switched in order to receive any of the operational receive frequencies.

It should be noted that all of the audio outputs of the receivers can be interfaced with the serial diversity polling scheme used in conjunction with the SCADA interface for controlling the regenerative amplifier system, as discussed above. Each receiver can also provide up to two squelch thresholds (typically 20 dB and 40 db) which can be used to control the polling circuitry for selection of either the surface receiver (outside the tunnel area) or an underground receiver (inside the tunnel area).

The above arrangement also makes possible the use of radio transmitters for master oscillator synchronization for simulcast operation with the surface communications system. In this case, transmit audio can be obtained from the existing distribution amplifiers that provide audio for the surface system. The backup transmitter and receiver units for both the 80 MHz. and 160 MHz. RF bands can be controllably switched into operation if any of the operational units fail. All audio, control and RF connections can easily be switched to the appropriate channel with one simple operation.

While the invention has been particularly shown and described with reference to various embodiments, it will be recognized by those skilled in the art that other modifications and changes may be made to the present invention described above without departing from the spirit and scope thereof.

We claim:

1. In an RF communication system using a plurality of cascaded amplifier stages for amplifying signals being transmitted and received along a plurality of lengths of transmission line, the improvement wherein successive signal amplification is realized with reduced intermodulation distortion, the improvement comprising the steps of:
   down-converting the transmitted RF signals to an intermediate frequency (IF) level by using a pilot signal in combination with a local oscillator signal,
   applying said down-converted IF signals, in combination with said pilot signal, to said transmission line lengths,
   at each of said amplifier stages, up-converting said IF signals to regenerate the original RF signals using said pilot signal,
   amplifying said IF signals to a desired level,
   amplifying said regenerated RF signals to a desired level and applying the signals to the lengths of transmission line at the output end of said amplifier stages, and
   applying said amplified IF signals and said pilot signals to said output transmission line for regenerating said RF signals at the succeeding amplifier stage.

2. The improved RF communication system of claim 1 wherein said RF signals are transmitted and received between at least one base station and at least one mobile communication unit located adjacent said lengths of transmission line.

3. The improved RF communication system of claim 2 wherein said transmission line comprises radiating cable whereby RF signals transmitted from said base station (the "transmit" signals) and applied to the transmission line radiate outwardly therefrom for being received by said mobile communication units, and whereby signals transmitted from said mobile units (the "receive" signals) are coupled with said lengths of transmission line and transmitted to said base station.

4. The improved RF communication system of claim 3 wherein said amplifier stages are bi-directional so that both transmit and receive signals are amplified and wherein said receive signals are directly amplified at each of said amplifier stages without any IF conversion.

5. The improved RF communications system of claim 3 wherein said receive signals are down-converted at the first of said cascaded amplifier stages to the level of the same IF signals used for said transmit signals by using said pilot signal;
   said down-converted IF signals and said pilot signal are transmitted to said base station; and
   said IF signals are up-converted at said base station, using said pilot signal to regenerate the original RF receive signal from said mobile units.

6. The RF communications system as set forth in claim 3 wherein said pilot signal used for down-converting and regenerating said RF transmit signals is also used in conjunction with said IF signals for monitoring any failure of said amplification stages in amplifying said transmit and receive signals.

7. The RF communications system of claim 6 wherein the phase of a portion of said regenerated amplified transmit signals is shifted at each of said amplifier stages and amplified together with said receive signals in the receive direction.

8. A two-way communication system for establishing RF signal coverage within a RF-blocked area such as a tunnel, subway or the like comprising:
   at least one base station for transmitting and receiving RF signals inside or outside said RF blocked area;
   at least one radio unit disposed within said RF blocked area;
   a plurality of lengths of radiating cable disposed within said RF blocked area and arranged to radiate signals from said base station (the "transmit" signals) being propagated therethrough so as to be received by a radio unit located about said cable, and to receive RF signals from such a radio unit (the "receive signals") and relay the signals to said base station; and a plurality of amplifier stages linking and radiating cable lengths, said amplifier stages adapted to amplify both said transmit and receive signals;

said base station comprising means for down-converting the transmit RF signals to a band of intermediate frequency (IF) signals by using a pilot signal in conjunction with a local oscillator signal;

means for applying said down-converted IF signals, in combination with said pilot signal, to said radiating cable lengths;

each of said amplifier stages comprising means for up-converting said IF signals to regenerate the original RF signals using said pilot signal;

means for amplifying said IF signals and said regenerated RF signals to the radiating cable length at the output end of the amplifier stage; and means for applying said amplified IF signals and said pilot signal to said radiating cable length, in order that said RF signals may be regenerated at each succeeding amplifier stage to provide IF signals and amplified regenerated RF signals, wherein successive signal amplification at each of said plurality of amplifier stages is realized with reduced intermodulation distortion.

9. The RF communications system as set forth in claim 8 wherein said base station is connected to said radiating cable lengths in said RF blocked area by means of at least one length of non-radiating cable.

10. The RF communications system of claim 9 wherein one of said amplifier stages proximate to said non-radiating cable length connecting to said base station further comprises means for down-converting said receive signals to approximately the same IF band used for said transmit signals by using said pilot signal, and means for applying said IF signals and said pilot signal to said non-radiating cable length to be relayed to said base station; and wherein said base station further comprises means for using said pilot signal for up-converting said IF signals to regenerate the original receive signals from said radio units.

11. The RF communications system as set forth in claim 8 wherein said pilot signal used for down-converting and regenerating said RF transmit signals is also used in conjunction with said IF signals for monitoring any failure of said amplification stages in amplifying said transmit and receive signals.

12. The RF communications system of claim 10 wherein said amplification stages further include means for shifting the phase of a portion of said amplified regenerated RF signals and amplifying said phase-shifted signal with said receive signals in the receive direction.

13. In a distributed amplification system using a plurality of cascaded amplifier stages for amplifying RF signals transmitted therethrough, a method of reducing intermodulation distortion in the amplified RF signals while achieving the desired level of amplification, the method comprising the steps of:

down-converting the transmitted RF signals to an intermediate frequency (IF) level by using a pilot signal in combination with a local oscillator signal to provide IF signals, amplifying said IF signals to a desired level, and up-converting said amplified signals, using said pilot signal, to regenerate the original RF signals at each amplifier stage where said RF signals are required, wherein the overall intermodulation generated by said distributed amplification system is substantially independent of the number of said plurality of cascaded amplifier stages.

14. The method of reducing intermodulation distortion as set forth in claim 13 wherein said pilot signal used for down-converting and regenerating said RF transmit signals is also used, in conjunction with said IF signals, for monitoring the operation of said amplifier stages.

* * * * *